Feb. 12, 1929.

A. L. MIÉVILLE 1,702,125

ROLLER BEARING ASSEMBLY

Filed Oct. 13, 1923    2 Sheets-Sheet 1

Inventor
Arthur L. Miéville
By Sturtevant & Mason
Attorneys

Patented Feb. 12, 1929.

1,702,125

UNITED STATES PATENT OFFICE.

ARTHUR LEONARD MIÉVILLE, OF SOUTHPORT, ENGLAND.

ROLLER-BEARING ASSEMBLY.

Application filed October 13, 1923. Serial No. 668,379.

This invention relates to roller-bearings, and comprises improvements in pedestals or blocks for axles and shafts, and also in wheels used with roller-bearings. The object of the invention is to produce cheaply a fairly high grade roller-bearing, suitable for use, for example, on wagons and cars, such as colliery tubs, corves, contractors' tipping wagons, light railway cars and the like. The cheapening in manufacture is effected by the entire, or almost entire, absence of machining.

According to my invention, I use a smooth sleeve or tube in association with an unmachined or very roughly machined casting, in order to produce the effect of a machined casting, and have the advantage of rapid and cheap replacement of the wearing part in case of necessity. Accordingly, the boss or hub of the pedestal, or of the wheel, and in some cases also the foot of the pedestal, are cast in two or more parts, and the castings are formed internally so as to produce, when the castings are secured together, a cell in which the sleeve or tube is located and in which the rollers run. The end walls of the cell may be formed by washers, which also may form the inner walls of grooves in which rings of felt or other suitable material can be placed to retain the lubricant and exclude dirt.

Furthermore, with castings made in the way I show, after the rings of felt or other suitable material have been put in place, and after the washers and tube have also been put in place, the castings can be bolted up or tightened together in an approved manner, and in tightening the cell becomes substantially rigid and the rings of felt or other material may be compressed, thus ensuring that the felt or other material itself shall tighten upon the axle and so prevent the dirt getting in and the grease getting out around the axle.

In the accompanying drawings:—

Figure 1 is a plan view, partly in section, of a roller bearing pedestal in accordance with my invention;

Figure 2 a front elevation, partly in section, on the line A—A of the same.

Figure 1:
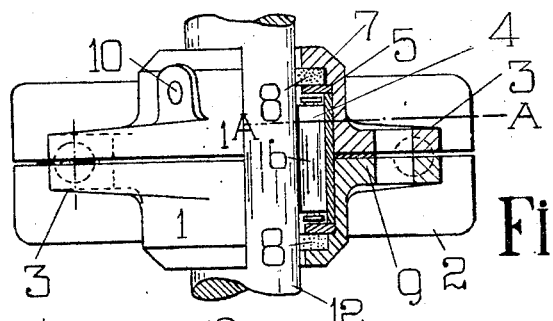
Figure 2:
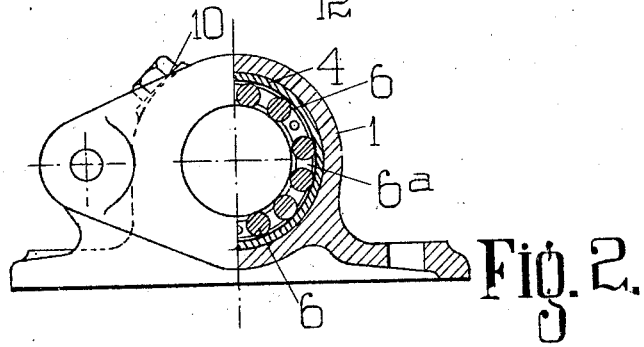

Referring first to Figs. 1 and 2, wherein is shown a pedestal with its foot cast in two parts and divided on the centre line, 1 is the boss of the pedestal, and 2 the foot thereof. The parts of the casting may be held together by bolts passed through the lugs 3, or the lugs may be omitted, and the parts of the casting secured together by any convenient method.

4 is a sleeve or tube, preferably of steel, being of weldless or other smooth-finished commercial tubing, cut to length as required.

At each end of the sleeve 4 is provided a loose metal washer 5. The sleeve and metal washers are mounted in the pedestal, and when the parts of the pedestal are bolted or otherwise secured together, the sleeve and washers are gripped and so fixed in position. Each washer 5 serves to take the end thrust of the rollers 6, or their cage 6$^a$ where the rollers are caged, and at the same time to form one wall of an annular groove or recess 7 for a ring 8 of felt or other suitable material, provided to prevent the escape of lubricant from and the entrance of dirt into the bearing round the axle.

Figure 3:
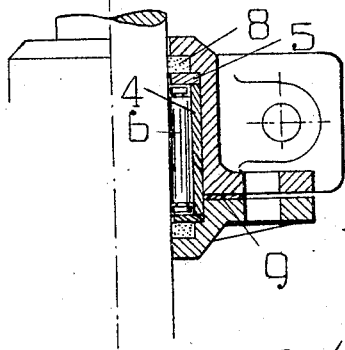
Figure 3 is a plan view, partly in section, of a slight modification.

The pedestal may be divided either on the centre line as in Figs. 1 and 2, or at any other convenient place, for instance, as shown in Fig. 3 where the whole foot of the pedestal is cast solid with the major part of the pedestal.

The pedestal castings are very smoothly cored out or chilled (or roughly machined, if desired) so as to produce the form required for the sleeve and the recesses for the rings of felt or other material. Such castings may be designated as "unfinished".

Between the two parts of the pedestal castings a washer 9 of soft metal, say lead wire, or fibrous material, say, felt, is placed. When the pedestal parts are held up tightly together by any convenient means such as bolts, studs, screws or the like or by screwing one half upon the other, the washer 9 is compressed and so fills the slight roughnesses on the casting faces and prevents the escape of lubricant from the bearing.

Provision may be made for the introduction of lubricant by any convenient means such as by a grease-plug in the boss 10 fitted with set screw, and the sleeve may be cut away to allow access of the lubricant direct to the rollers. In cases where a projecting boss is objectionable, the two half castings may be separated and grease placed directly on the rollers, the castings being then bolted up again.

Figure 4:
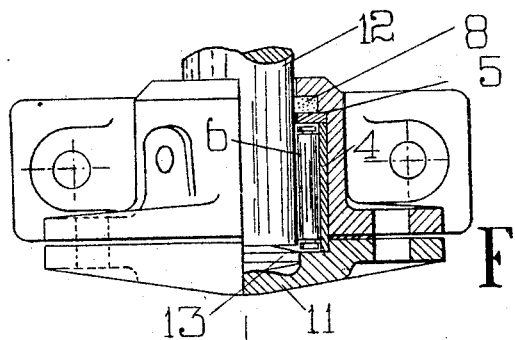
Figure 4 is a plan, partly in section, of another construction.

In bearings or hubs of any kind where the axle passes clear through, as in Figs. 1, 2 and 3, washers 5 and felt rings 8 are provided at each end. Where the end of the axle lies within the casting, as in Fig. 4 a single set of washers 5 and felt rings 8 is provided, and the cap of the casting is blanked off, as at 11, and may be provided with a convex inner face upon which the end of the axle 12 may thrust with very small friction. An improved method is to place, as shown in Fig. 4, a lens-shaped disc 13 of hardened steel between the end of the axle 12 and the inner face of the cap, so providing for cheap replacement of the wearing part in case of necessity.

Figure 5:
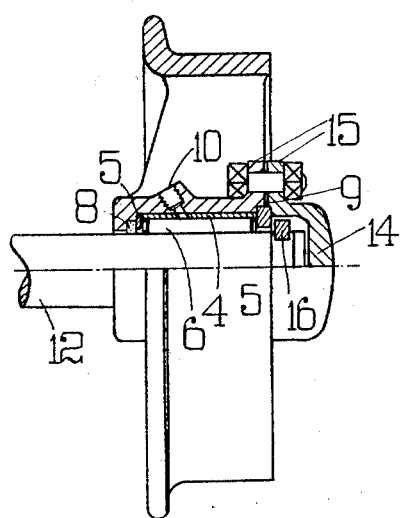
Figures 5 and 6 illustrate the application of the invention to a roller-bearing vehicle wheel.
Figure 6:
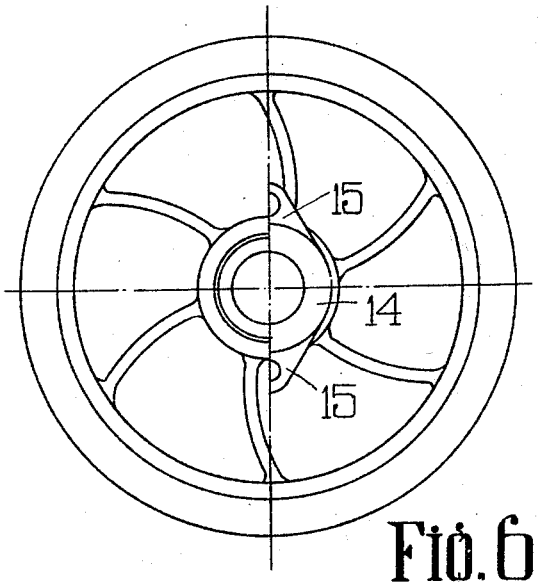

The invention as applied to roller-bearing vehicle wheels is illustrated in Figs. 5 and 6, in which 14 is a cap bolted on to the outer side of the wheel through lugs 15, a washer 9 of soft metal or of fibre, as already described, being used between the two joint-faces of the castings, 16 is an additional metal washer to support the outside washer 5. In order to reduce friction due to end-thrust of the axle, a lens-shaped disc may be introduced between the end of the axle and the cap 14, as in the case of pedestals where the end of the axle lies within the pedestals.

All the above arrangements refer to cases in which the hubs can be threaded on to the axles from one end. In cases where an obstruction prevents the hubs from being threaded on to the axles, it has been the custom in the past to split the hubs on a central horizontal plane.

Figure 7:
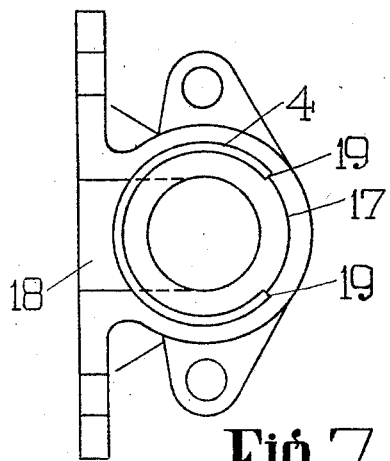
Figures 7 and 8 illustrate a construction adapted for cases where the pedestal cannot be threaded on to the axle.
Figure 8:
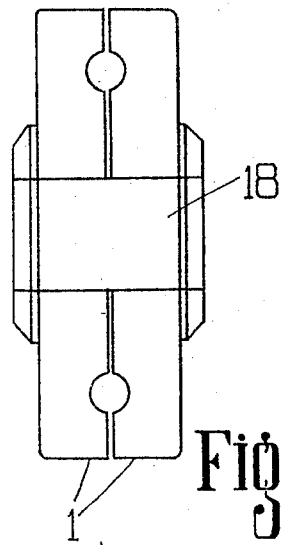

According to my invention, as shown in Figs. 7 and 8, the sleeves 4 instead of being solid or split along the centre line or otherwise as before mentioned, or in any way being cut in halves, would have a segment cut away as at 17, throughout the length of the sleeve of such width as to allow the sleeve to be mounted upon the axle. As the axle is smaller in diameter than the sleeve such cutting away will leave as a result the major part of the sleeve 4 available as a race for the rollers.

The hub or pedestal itself would necessarily be divided in some way for mounting upon the axle, and is cut away in a similar manner to the sleeve, the gap being closed by the filling-piece 18.

In mounting upon the axle, the gapped sleeve 4 is slipped on to the axle 12, and the two half castings 1 are also mounted on the axle. The steel washers 5, split at one point and then bent sideways or sprung open to allow of their being slipped over the axle, and also the felt rings 8, similarly split, are all mounted on the axle, the washers being then placed in their proper places in the castings. A split set of rollers, or plain rollers only, as the case may be, is then introduced. The sleeve 4 is slipped into its place in one half casting, and the rollers into their place within the sleeve. The other half casting is then put into place (some jointing material being used to make the casting grease proof), and on tightening up, the sleeve grips the steel washers and the felt rings are compressed, as already described. The filling-piece or cover 18 is then assembled to close the gap in the castings.

When a sleeve cut away as described lies in its place within the hub, the surface presented to the rollers to roll upon would not be continuous, there being two lines which may or may not be parallel to the axis of the axle or to one another where the sleeve surface ends and a gap is formed in the race surface lying between these two lines. Provided that the position of the line of maximum pressure between the rollers and the sleeve remain substantially constant, the sleeve could be placed so as to invariably present a smooth rolling surface to the rollers at this line of maximum pressure as well as for a considerable distance on either side of such line.

Where such an arrangement is used the part of the hub or pedestal itself which spans the gap in the sleeve, could be made of such a shape as to present a surface 19 to each of the two cut faces of the sleeve, and so prevent the rotation or displacement of the sleeve from the position assigned to it.

Pedestals or wheels made in accordance with my invention have the advantage of being exceptionally cheap owing to their requiring little or no machining, and at the same time the sleeves provide a substantially accurate surface for the rollers and are cheap and easily replaceable.

The use of the metal end washers simplifies the casting, so that it becomes unnecessary to machine the grooves for the felt washers; also by this method solid felt-washers can be put into place rapidly without damage to the felt.

I declare that what I claim is:—

A roller bearing block for relatively rotating members, comprising an assembly of two unfinished castings having their adjacent faces in planes at right angles to the axis of the members and together constituting the outer of said members, each of said members having a cavity therein roughly concentric to such axis and terminating at an inwardly extending flange, the other of said members being cylindrical and passing through an aperture of at least one of said flanges and being received within the cavities, the wall of said aperture having a rebate therein adjacent the respective cavity, a cylindrical seamless sleeve consisting of a cut-off length of drawn tubing located loosely in said cavities about said other member and spanning the gap between said castings, rollers between said other member and said sleeve to support said members for rotation with respect to each other, a metal washer of substantially the same external diameter as said sleeve and of an internal diameter substantially the same as the aperture of said flange and received in the cavity of the corresponding casting, and a felt packing ring located in said rebate between said washer and flange and compressed upon the said other member by movement of said washer by said sleeve when the castings are brought together.

In witness whereof, I have hereunto signed my name this 3rd day of Oct. 1923.

ARTHUR LEONARD MIÉVILLE.